United States Patent [19]

Deininger

[11] Patent Number: 4,544,822
[45] Date of Patent: Oct. 1, 1985

[54] ELECTRODE HOLDER FOR A RESISTANCE WELDING GUN

[75] Inventor: Harry T. Deininger, Vincentown, N.J.

[73] Assignee: The Budd Company, Troy, Mich.

[21] Appl. No.: 503,922

[22] Filed: Jun. 13, 1983

[51] Int. Cl.[4] .................................... B23K 11/30
[52] U.S. Cl. ................... 219/120; 219/119; 219/86.1
[58] Field of Search ............... 219/89, 90, 119, 120, 219/78.01, 86.1

[56] References Cited

U.S. PATENT DOCUMENTS

| | | | |
|---|---|---|---|
| 1,982,098 | 11/1934 | Hartmann | 219/119 |
| 2,502,876 | 4/1950 | Mullen | 219/120 |
| 2,829,239 | 4/1958 | Boretti | 219/120 |
| 2,890,324 | 6/1959 | Havlik | 219/120 X |
| 4,208,566 | 6/1980 | Eghammer et al. | 219/89 X |
| 4,329,559 | 5/1982 | Kishi et al. | 219/89 |
| 4,356,373 | 10/1982 | Mattson et al. | 219/86.1 X |

*Primary Examiner*—C. L. Albritton
*Assistant Examiner*—Catherine M. Sigda
*Attorney, Agent, or Firm*—Edward M. Farrell; Herman Foster; T. I. Davenport

[57] ABSTRACT

A welding electrode assembly includes an electrode holder having a "knock-out" cap electrode disposed to engage a workpiece during a resistance welding operation. The electrode holder is surrounded by electrical insulating material which in turn is covered by a wear resistant metal shield. Means are provided for cooling fluid to flow through the electrode holder close to the cap electrode.

1 Claim, 4 Drawing Figures

ELECTRODE HOLDER FOR A RESISTANCE WELDING GUN

BACKGROUND OF THE INVENTION

Resistance welding is used extensively for welding two or more metal pieces together. Generally, in such an operation, upper and lower electrodes are positioned on opposite sides of the workpieces and are movable to engage and disengage the workpieces. A source of electrical power is connected to cause very high current to pass through the electrodes and workpieces to melt areas of the workpieces to complete the welding operation.

Because of the extremely high heat generated in resistance welding operation, a cooling fluid must be circulated through the electrodes close to the ends or tips. If enough cooling is not provided at the welding ends of the electrodes, the tips or caps at the ends tend to mushroom and deteriorate in relatively short times requiring frequent replacements. In some types of welding holders, the ends or tips are integral parts of the holders requiring replacements of the entire electrode holder if the ends become deteriorated.

Another problem, towards which the present invention is particularly directed, is that the electrode holder is often completely exposed so that if a welding operation is being performed in confined or limited areas of access and the workpieces have complex shapes, parts of electrode body carrying the welding current make electrical contact with areas outside of welding areas. These conditions cause arcing which erodes the electrode holders requiring frequent replacements. In other cases, the shape of the electrode is such so as to prohibit its use in confined areas. It would be desirable to provide simple and inexpensive means for overcoming the problems of the undesired arcing and restrictions of use because of the shape of the electrode without major modifications of the basic electrode body involved.

OBJECTS OF THE INVENTION

It is an object of this invention to provide an improved electrode holder for a resistance welding gun.

It is a further object of this invention to provide an improved electrode holder for a resistance welding gun wherein deterioration of the electrode holder resulting from arcing is eliminated.

It is still a further object of this invention to provide an improved electrode assembly in which "knock-out" electrode caps are provided which are easily and quickly replaceable.

It is still a further object of this invention to provide an improved electrode capable of use in confined spaces.

BRIEF SUMMARY OF THE INVENTION

In accordance with the present invention, an electrode holder assembly includes an electrode holder disposed to be connected to a source of electrical power. A replaceable electrode cap is secured on the end of the electrode holder to engage a workpiece during a welding operation. Means are provided for supplying cooling fluid through electrode holder to cool the electrode cap. An insulating material surrounds the electrode holder in close proximity to the electrode cap. A relatively hard wear resistance shield surrounds the insulation material so that when the electrode cap is moved into contact with the weld area of the workpiece without the electrode holder directly contacting adjacent workpiece areas.

Other objects of and advantages of the present invention will be apparent and suggest themselves to those skilled in the art, from a reading of the following specification and claims taken in conjunction with the accompanying drawing.

DESCRIPTION OF THE INVENTION

Figure 1:
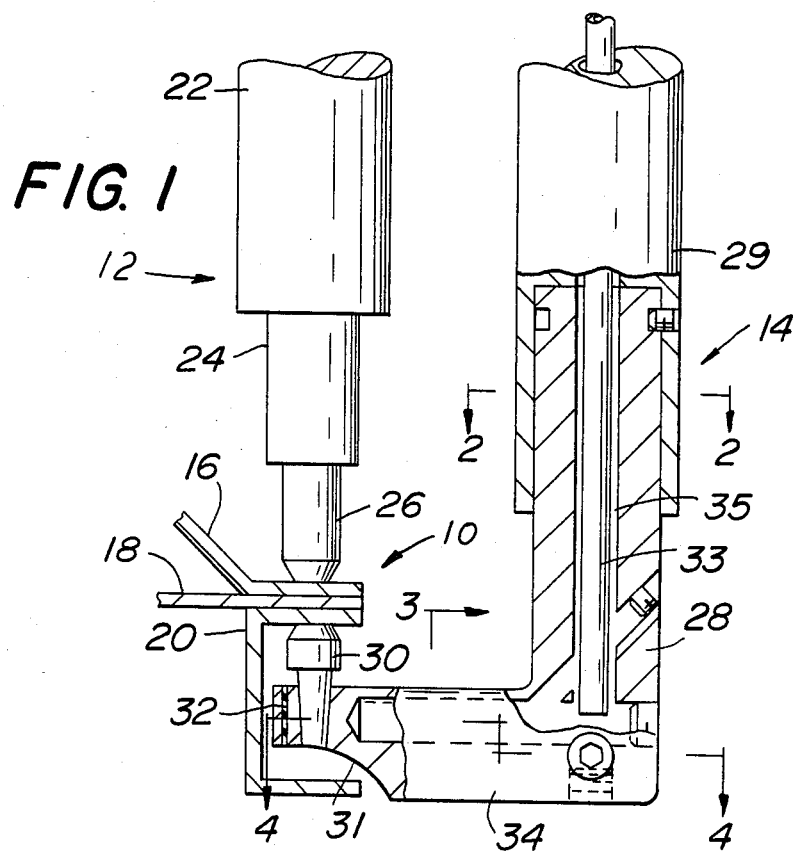
FIG. 1 is a side view, partly in cross section, illustrating a pair of electrode holders positioned to perform a welding operation on workpieces.

Referring to FIG. 1, welding apparatus 10 includes an upper assembly 12 and a lower assembly 14. The assemblies 12 and 14 are disposed on opposite sides of a plurality of workpieces. The workpieces 16, 18 and 20 are disposed to be welded together.

The upper assembly 12 includes an hydraulic or air cylinder 22, an electrode holder 24 and an electrode 26. The upper assembly 12 is moved downwards into position by the actuating cylinder 22 after the lower assembly 14 has been moved into position.

The bottom assembly 14 includes an electrode holder 28 secured to a yoke 29. The end of the electrode holder 28 includes a mounted electrode cap 30, which is replaceable. This cap may be tapered and designed to be knocked out of the holder 28.

Many details related to a resistance welding operation are not illustrated because they are well known and only indirectly related to the present invention. For example, it is known that a power source is connected to a pair of electrodes having workpieces therebetween to melt the metal to perform a welding operation. The various steps in a resistance welding operation are also well known.

In a resistance welding operation, the electrodes of a welding gun are closed to contact the workpiece which may involve two pieces to be welded together. The time that the welding tips are in contact with the workpiece is generally called "squeeze time". After the welding gun is in contact with the workpieces, the welding current is applied.

The time that the welding current is applied is generally called "weld time". Following the weld current, the welding gun is held in contact with the workpiece for a predetermined time period to assure a good weld. This time is generally called "hold time". After the welding gun is removed from the workpieces, it is idle or off until the next welding operation. The time between welding operations is generally called "off time".

The present invention is directed to a welding gun assembly desired for use in a confined area where the space for receiving the electrode holder and tip is limited and the liklihood of creating electrical arcing is great. The lower assembly 14 is designed to overcome these problems.

The workpieces 16, 18 and 20 are of irregular shape as indicated with the workpiece 20 being channel shaped. For example the workpieces may involve a curved floor pan in an automobile, with the workpieces 16 and 18 being cold rolled in steel and the workpiece 20 being galvanized coated cold rolled steel.

The area into which the end of the essentially "L" shaped electrode holder 28 must fit may be in the order of one inch. The end of the holder 28 includes a gradually curved tapered area 31 to permit insertion in to a one inch area, such as that of the channel workpiece 20.

Because of the very high heat generated during a resistance welding operation, means are provided to circulate a cooling fluid close to the area of the cap 30. This is provided by a tubing 33 which extends through suitable openings 35 in both sections of the "L" shaped holder 28. The cooling fluid is circulated through the tubing 33, exits therefrom and returns in the space between the tubing and holder. In some systems, the cooling fluid does not extend close enough to the electrode tips to prevent corrosion.

Figure 3:
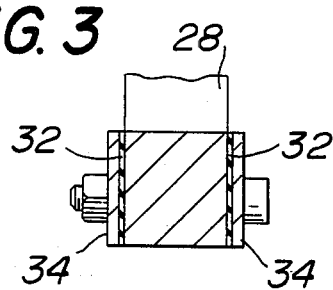
FIG. 3 is a cross sectional view taken along lines 3—3 of FIG. 1.
Figure 2:
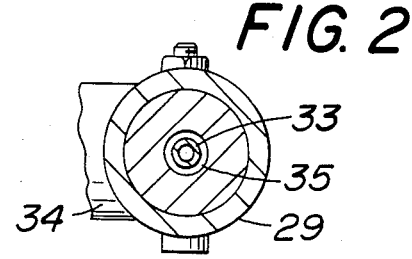
FIG. 2 is a cross sectional view taken along lines 2—2 of FIG. 1.
Figure 4:
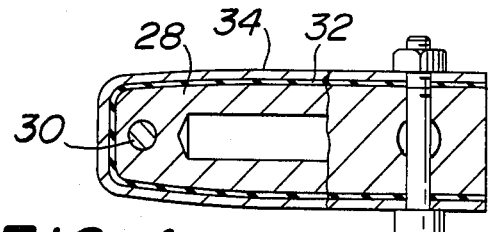
FIG. 4 is a cross sectional view taken along lines 4—4 of FIG. 1.

Referring to FIGS. 2, 3 and 4, along with FIG. 1, the bottom portion of the electrode holder 28 is covered by insulation material. To minimize modifications of the existing designs, only selected areas are covered by the insulation material. The electrical insulating material 32 is covered by a wear resistant shield 34, which may be metal. Generally conventional electrical insulating material is subject to wear thereby requiring the addition of a protective high wear resistant shield.

Thus the main body of the electrode holder 28 is insulated to prevent electrical arcing and at the same time provide high resistance to wear if the end of the holder rubs against or contacts adjacent workpiece areas during welding operations.

The improvements to the electrode holder to overcome the problems discussed above have been accomplished relatively easily without the need for major modifications of the assembly involved. In general, these improvements have been accomplished by providing electrical insulation, wear resistance, reshaping the end of the electrode holder, and providing cooling, and a replaceable cap electrode.

What is claimed is:
1. An electrode holder assembly comprising;
 a. an "L" shaped main body disposed to be connected to a source of electrical power;
 b. said main body being curved to a relatively narrow end portion to permit insertion into a relatively small area;
 c. a replaceable tapered electrode cap disposed on the end of said main body to engage a workpiece during a welding operation and dimensioned to be knocked out when replacement is required;
 d. means for supplying cooling fluid through said main body to cool said electrode cap;
 e. said means for supplying cooling fluid including tubing means extending through said main body to circulate fluid close to said electrode cap;
 f. an electrical material insulating within said electrode holder and surrounding a lower portion of said main body in close proximity to said electrode cap to prevent electrical arcing between said main body and said workpiece;
 g. a relatively thin hard wear resistant shield material surrounding said electrical insulating material to protect said insulating material when said main body contacts said workpiece, whereby said electrode cap is movable into contact with the weld area of said workpiece without said main body directly contacting adjacent areas.

* * * * *